US012761643B2

(12) United States Patent
Reaume et al.

(10) Patent No.: US 12,761,643 B2
(45) Date of Patent: Oct. 13, 2026

(54) SYSTEMS AND METHODS FOR IDENTIFYING AND PREDICTING INDUSTRIAL MACHINE MAINTENANCE EVENTS

(71) Applicant: Caterpillar Inc., Peoria, IL (US)

(72) Inventors: Daniel J. Reaume, Charlotte, NC (US); Sadia Khalil, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 298 days.

(21) Appl. No.: 18/733,798

(22) Filed: Jun. 4, 2024

(65) Prior Publication Data

US 2025/0370445 A1 Dec. 4, 2025

(51) Int. Cl.
*G05B 23/02* (2006.01)

(52) U.S. Cl.
CPC ................................ *G05B 23/0248* (2013.01)

(58) Field of Classification Search
CPC ...... G06F 18/241; G06F 18/214; G06F 18/24; G06N 20/00; G05B 23/0248; G05B 23/0221; G05B 23/024; G05B 23/0283
See application file for complete search history.

(56) References Cited

U.S. PATENT DOCUMENTS

| | | | | |
|---|---|---|---|---|
| 8,655,505 | B2 | 2/2014 | Sprock et al. | |
| 10,915,069 | B2 | 2/2021 | Neyens | |
| 11,262,744 | B2 | 3/2022 | Kamiguti et al. | |
| 2017/0169342 | A1 | 6/2017 | Waltinger | |
| 2020/0103894 | A1* | 4/2020 | Cella | G05B 19/418 |
| 2020/0233397 | A1* | 7/2020 | Bello | G06N 3/045 |
| 2023/0038902 | A1 | 2/2023 | Yoshinaga et al. | |
| 2024/0241510 | A1* | 7/2024 | Rameshkumar | G05B 23/0283 |

FOREIGN PATENT DOCUMENTS

| | | | | |
|---|---|---|---|---|
| CN | 117795569 | A | 3/2024 | |
| CN | 117828416 | A * | 4/2024 | G06N 3/0464 |
| WO | 2022271171 | A1 | 12/2022 | |

OTHER PUBLICATIONS

Yang, C., Liu, J., Zeng, Y. and Xie, G., 2019. Real-time condition monitoring and fault detection of components based on machine-learning reconstruction model. Renewable Energy, 133, pp. 433-441. (Year: 2019).*

Written Opinion and International Search Report for Int'l. Patent Appln. No. PCT/US2025/030786, mailed Sep. 1, 2025 (45 pgs).

* cited by examiner

*Primary Examiner* — Alicia M. Choi

(57) ABSTRACT

Systems and methods are disclosed herein for identifying and predicting maintenance events with respect to assets, such as mobile machinery. A computing platform can include control circuit(s) (on-board and/or remote) configured to acquire machine fault data and machine utilization data. A feature set can be generated by transforming the machine fault data (e.g., by fusing the machine fault data with machine utilization data), normalizing the data, generating embeddings, and/or executing imputation algorithms to fill in missing values. A classifier model can be trained using the transformed machine fault data in conjunction with labeled maintenance event data to enable the trained classifier model to learn to recognize utilization-specific fault code patterns. The trained classifier model can generate inferences and predictions regarding machinery maintenance events without the use of maintenance data.

20 Claims, 8 Drawing Sheets

SYSTEMS AND METHODS FOR IDENTIFYING AND PREDICTING INDUSTRIAL MACHINE MAINTENANCE EVENTS

BACKGROUND

An OEM (Original Equipment Manufacturer) service network is a system of support services provided by the original manufacturer of an asset, such as industrial machinery. The support services can include troubleshooting, maintenance, parts replacement, and repair. The OEM service network can include service centers, technicians, and customer service representatives trained in the handling and servicing of the manufacturer's products. OEM customers may choose to maintain the assets at service points outside of OEM service networks. When this happens, OEM entities may not receive information regarding equipment problems and repairs made, which can affect OEM and OEM customer ability to monitor and predict remaining useful life of assets serviced outside of OEM service networks.

SUMMARY

Disclosed herein are systems, methods, and computer-readable media (also sometimes referred to, individually or collectively, as "platforms" or "computing platforms") for identifying and predicting maintenance events with respect to assets, such as mobile machinery. Mobile machinery assets can include earth moving machinery, construction machinery, generator sets (gensets), and so forth.

In some use cases, maintenance events can be known to the asset OEM. For example, maintenance events can be planned and/or performed by entities within a particular OEM's service network. In some use cases, maintenance events can be unknown to the OEM. In such cases, the platform can apply one or more trained artificial intelligence/machine learning (AI/ML) models to identify maintenance events that occurred in the past and to generate inferences and/or imputations about attributes of the maintenance events. Accordingly, the platform can enable identification of historical maintenance events that, ordinarily, would be unknown to the OEM (e.g., maintenance outside of OEM service network).

To identify unknown maintenance events, the platform can be configured to fuse data items that, individually or as sequences of items (e.g., as successive sensor readings) isolated from other data points, may not be sufficient to determine that maintenance events occurred. The data items can include, for example, sensor readings, fault codes, and/or equipment utilization data. Fusing the data items can include performing computer-based operations to relationally link and/or enhance the items, generate derivations (e.g., additional data items) based on the items, generate embeddings based on the items, where embeddings can include vectorized information for a combination of items from different datasets, and so forth. Fusing the data items can make them suitable for use in input features to AI/ML models.

The fused data items can be utilized to create input features for AI/ML models, such as classification models, imputers (regression-based models), transformers, foundation models, and/or large language models (LLMs). The input features can be used to train the AI/ML models to automatically identify patterns in telematics and/or asset utilization data. The identified patterns can be utilized by the trained AI/ML models to make further inferences regarding unknown maintenance events and their attributes. The inferences can include predictions that identify specific parts affected by future maintenance events. The inferences can also include event timing. For example, maintenance event timing can be inferred based on changes in detected patterns of incoming telematics data streams and/or by combining telematics data with supplemental data, such as weather reports. The identified patterns can also be used by the AI/ML models to automatically classify the identified or inferred event types. The event types can include, for example, preventative maintenance events, asset/part repair events, and/or asset/part rebuild events.

The identifications and inferences of past maintenance events, including unknown events, can be utilized to generate predictions regarding remaining useful life of a particular asset and/or its components. For example, the platform can determine historical patterns and/or periodicity for a particular type of maintenance event (e.g., Diesel Exhaust Fluid (DEF) filter change) and, based on this information, generate a first prediction regarding a first maintenance schedule (e.g., given the asset's utilization pattern) and a second prediction regarding a second maintenance schedule (e.g., given a manufacturer-recommended base maintenance schedule, given a maintenance schedule consistent with the history of maintenance for the asset, and so forth). The platform can, therefore, generate predictions regarding timing and impact of anticipated downstream repairs (e.g., asset downtime, cost) for the various maintenance options. For example, because DEF filters minimize buildup of contaminants in selective catalytic reduction (CSR) systems, utilization-appropriate DEF filter replacement can enable a deferral or minimization of repairs to the CSR system. Therefore, the platform enables identification of known and/or unknown (unreported) maintenance history for an asset and optimization of subsequent maintenance events given the specific asset's automatically determined utilization.

As a result, the platform can enable extending the useful life of a particular asset. In some use cases, the useful life of the asset can be extended to support a particular utilization pattern. In some use cases, the overall useful life of an asset can be optimized or extended by, for example, predicting an optimal time window for heavy utilization (e.g., drilling) and the corresponding maintenance events, and generating a recommendation regarding the timing of asset rotation to a lighter utilization.

BRIEF DESCRIPTION OF THE DRAWINGS

Detailed descriptions of implementations of the present invention will be described and explained through the use of the accompanying drawings.

Figure 1A:
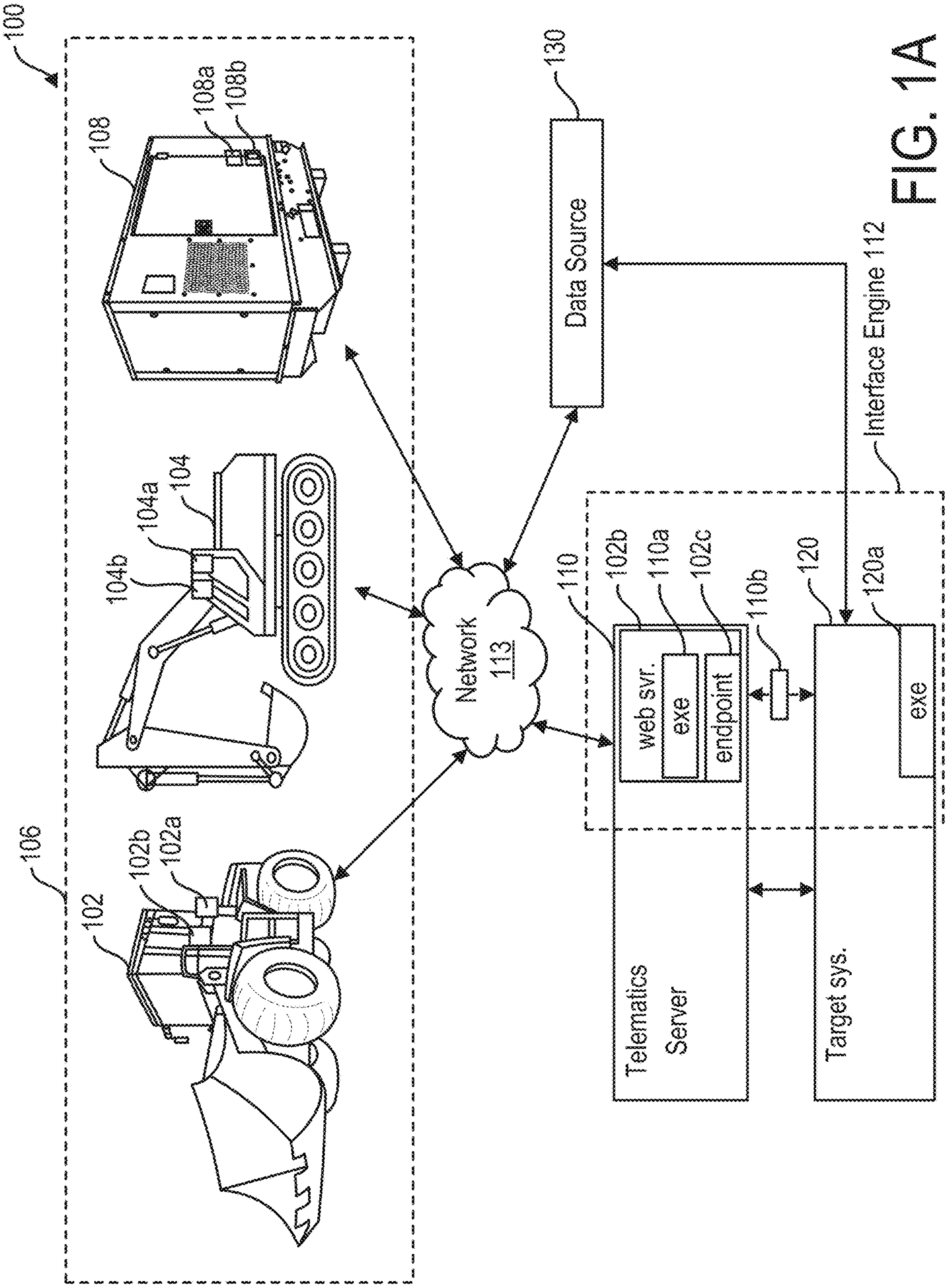
FIG. 1A shows an example telematics ecosystem for monitoring of industrial assets, such as vehicles and machinery.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Systems and methods are disclosed herein for identifying and predicting maintenance events with respect to assets, such as mobile machinery. A computing platform can include control circuit(s) (on-board and/or remote) configured to acquire machine fault data and machine utilization data. A feature set can be generated by transforming the machine fault data (e.g., by fusing the machine fault data with machine utilization data), normalizing the data, generating embeddings, and/or executing imputation algorithms to fill in missing values. A classifier model can be trained using the transformed machine fault data in conjunction with labeled maintenance event data to enable the trained classifier model to learn to recognize utilization-specific fault code patterns. The trained classifier model can generate inferences and predictions regarding machinery maintenance events without the use of maintenance data. Accordingly, the computing platform can generate utilization- and maintenance-history specific maintenance plans for machinery even when the service history is unknown or incomplete.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

As used herein, the term “set” refers to a physical or logical collection of objects, which can contain no objects (e.g., a null set, an empty set), one object, or two or more objects. The terms “engine”, “application”, “program”, “circuit” and “executable” refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations, as defined by parametrized functions, specific configuration settings, special-purpose code, and/or the like. Engines, applications, programs and executables can generate and/or receive various electronic messages.

Telematics Ecosystem

FIG. 1A shows an example telematics ecosystem 100 for monitoring of various assets, such as vehicles, gensets, and machinery. In operation, the one or more assets (102, 104, 108) can generate operating data captured by various sensors (102*a*, 104*a*, 108*a*). The operating data can be transmitted, via the network 113, to one or more telematics servers 110, which can generate API messages 110*b* to transmit the operating data, in original or modified form, to various target computing system(s) 120. The target computing system(s) 120 can use the received data as training data (e.g., for AI/ML systems), for analytics relating to operating conditions of the assets (102, 104, 108) and so forth.

One or more types of assets (102, 104, 108) can be included in a particular fleet 106. The assets (102, 104, 108) in the particular fleet 106 can be associated with one or more original equipment manufacturers (OEM). The assets (102, 104, 108) can include various mobile machinery items, such as earth moving machinery, mobile construction machinery and so forth, which perform various tasks, such as excavation, loading, transportation, drilling, spreading, compacting, and/or trenching of earth, rock and other materials and can be deployed for work on roads, in quarries, in mines and so forth. Accordingly, the assets (102, 104, 108) can include dozers, loaders (swing loaders, skid-steer loaders, backhoe loaders, and so forth), excavators, trenchers, dumpers, scrapers, graders, landfill compactors, rollers, pipelayers, drills, tool carriers, drainage pipe layers, ploughs, mixers (e.g., concrete mixers) and so forth. The assets (102, 104, 108) can be individual machines or combinations of devices (e.g., combinations of base machines and equipment or attachments, such as augers, buckets, blades, tillers, forks, rakes, trenchers, shears, compactors, pulverizers, and so forth) where the combinations can be identified by a product identification number (PIN), machine serial number, or another identifier. According to various implementations, the assets (102, 104, 108) can be direct-controlled devices (e.g., devices controlled by an operator in physical contact with the device) and/or self-propelled devices. The assets (102, 104, 108) can be ride-on devices, non-riding direct-controlled devices, non-riding remote controlled devices, mobile remote-controlled devices, and so forth. The assets (102, 104, 108) can further include generators or gensets (generator sets, which can include engines that drive generators that can provide power used to run other equipment). The assets (102, 104, 108) can be wire-controlled and/or wireless-controlled.

Assets (102, 104, 108) generate and report various items of information. To generate and report the information, assets (102, 104, 108) can each include a set of sensors (102*a*, 104*a*, 108*a*) and a set of controllers (102*b*, 104*b*, 108*b*). The sensors (102*a*, 104*a*, 108*a*) are configured to enable monitoring a variety of operating conditions, including real-time operating conditions of the assets (102, 104, 108) and real-time operating conditions for asset components (e.g., engine, attachments, surroundings, operating environment and so forth). The sensors (102*a*, 104*a*, 108*a*) can collect operating data, which is transmitted by the controllers (102*b*, 104*b*, 108*b*), via the network 113, to one or more telematics servers 110. The network 113 can operate according to one or more wired or wireless protocols, such as Wi-Fi, cellular, radio, satellite, Bluetooth, ZigBee, etc. To enable transmission of data and traffic management, the network 113 can include connectivity equipment, such as modems, Bluetooth transceivers, Bluetooth beacons, RFID transceivers, NFC transmitters, and the like. In some implementations, the network 113 can include a controller area network (CAN) of a particular asset (102, 104, 108).

The sensors (102_a_, 104_a_, 108_a_) can provide analog readings and/or digital readings. The information provided by the sensors can be used to perform on-board and/or remote diagnostics of the assets (102, 104, 108) and can relate to various operating parameters of the assets (102, 104, 108). According to various implementations, the sensors (102_a_, 104_a_, 108_a_) can include radar components, lidar components, cameras, ultrasonic devices, GPSs (global positioning systems) and/or other suitable components. The sensors can include components that provide two-dimensional (2D) or three-dimensional (3D) maps, readings, or information. For example, a sensor can include a camera capable of capturing light and/or other electromagnetic radiation through pixels (e.g., as in the case of a charge-couple device (CCD)). For example, a sensor can include a 2D arrangement of pixels (e.g., "cells"), each of which is capable of recording one or more signals (e.g., associated with photons of a particular range of wavelengths). In some implementations, the assets can include multiple such sensors, thereby enabling the signal evaluation platform to generate a 3D mapping of objects in the vicinity of the assets. In some implementations, sensors (102_a_, 104_a_, 108_a_) can provide on-demand and/or periodic readings regarding engine-out exhaust gas temperature, NOx levels, speed, engine torque, asset (102, 104, 108) positioning, temperature (e.g., coolant temperature, intake air temperature, exhaust gas temperature), oil pressure, tire pressure, load measurement, fuel consumption, and so forth. The sensors (102_a_, 104_a_, 108_a_) can also provide indications of operator engagement with or actuation (including automatic/autonomous actuation) of various components of the asset (102, 104, 108), such as steering wheel, attachment positioning levers, acceleration pedals, and so forth. Gensets 108 can include sensors 108_a_ that can provide measures of power output, such as voltage, amperage, and/or real power output (measured in kilowatts (KW) per hour).

The controllers (102_b_, 104_b_, 108_b_) can activate, operate, and/or control sensors (102_a_, 104_a_, 108_a_), fuse the readings of multiple sensors (102_a_, 104_a_, 108_a_), convert analog values to digital values, generate electronic messages containing sensor readings, and/or transmit sensor readings, via the network 113, to one or more telematics servers 110. The controllers (102_b_, 104_b_, 108_b_) can include hardware and/or software circuitry and can be associated with particular components of assets (102, 104, 108). For instance, controllers (102_b_, 104_b_, 108_b_) can include engine control units (ECUs) that control engine operations. In other examples, controllers (102_b_, 104_b_, 108_b_) can include powertrain control modules (PCMs), brake control modules (BCMs), door control units (DCUs), speed control units (SCUs), transmission control modules (TCMs), battery management systems (BCMs), telematics control units (TCUs), and so forth.

An example controller (102_b_, 104_b_, 108_b_) can be an electronic controller. The elements of an electronic controller (102_b_, 104_b_, 108_b_) can include, for instance, a processor/microcontroller, memory (e.g., SRAM, EEPROM, Flash), input devices (supply voltage and ground, digital input devices, analog input devices), output devices (actuator drivers, such as injectors, relays, valves), logic outputs, communication circuitry and equipment (CAN transceivers, Ethernet transceivers, including wired and wireless communication components), and various embedded software modules (boot loaders, metadata, configuration data). Accordingly, in some implementations, controllers (102_b_, 104_b_, 108_b_) can be structurally and/or communicatively integrated with sensors (102_a_, 104_a_, 108_a_). For instance, in an example where a particular controller (102_b_, 104_b_, 108_b_) is a TCU structured to collect, pre-process, and/or transmit telematics data, the controller (102_b_, 104_b_, 108_b_) can include a navigation unit (sensor (102_a_, 104_a_, 108_a_) that keeps track of the latitude and longitude of the asset (102, 104, 108)), a mobile communication transceiver (e.g., GSM, GPRS, Wi-Fi, WiMax, LTE or 5G), a memory, a processor, and/or a battery module and/or another power source (e.g., an interface to the power system of the asset (102, 104, 108)).

In telematics, edge computing techniques can offer a technical advantage of offloading complex processing tasks to edge computing systems in networks of computing systems, where the edge computing systems can pre-process sensor data for transmission to other nodes. Edge computing techniques can reduce the size of data transmissions and optimize network traffic. More specifically, edge computing techniques can optimize the use of transmission media bandwidth, increase the informational value of transmitted data, and/or increase the overall information throughput on a particular network. To that end, controllers (102_b_, 104_b_, 108_b_) can include edge computing features and can pre-process data from sensors (102_a_, 104_a_, 108_a_) by, for example, generating data averages, discarding data outliers, discarding repeated sensor data via periodic sampling, and so forth. In some implementations, the controllers (102_b_, 104_b_, 108_b_) can provide raw sensor data to the telematics server 110, which can perform edge computing operations by the executable 110_a_ prior to transmitting the sensor data to the target computing system(s) 120. In some implementations, the controllers (102_b_, 104_b_, 108_b_) are integrated with the telematics server 110. For example, the controllers (102_b_, 104_b_, 108_b_) can include the executable 110_a_, and/or multiple executables 110_a_ can be distributed across a particular controller (102_b_, 104_b_, 108_b_) and telematics server 110. In some implementations, the operations described herein can be performed, in whole or in part, at the controllers (102_b_, 104_b_, 108_b_).

In some implementations, the telematics server 110 can perform additional (e.g., increased-complexity) edge operations, such as generating virtual sensor values using information provided by multiple types of sensors (102_a_, 104_a_, 108_a_).

The executable 110_a_ at the telematics server 110 can include a fusion engine that can combine information from various sensors. For example, the executable 110_a_ can combine raw reflection data from lidar, radar, and/or ultrasonic sensors (102_a_, 104_a_, 108_a_) with raw frame data from camera sensors (102_a_, 104_a_, 108_a_) and/or additional data to more accurately estimate a distance from a particular surface point on the asset (102, 104, 108) or its attachment to the object photographed by the camera. In some examples, the additional data can be collected by a set of inertial movement unit (IMU) sensors (102_a_, 104_a_, 108_a_) and can include, for example, multi-axial acceleration data collected via accelerometer(s) of the IMU and/or multi-axial velocity data collected via gyroscope(s) of the IMU. In some examples, the additional data can include multi-axial translational movement data (surge, heave, sway), multi-axial rotational movement data (roll, pitch, yaw) and so forth. The sensors (102_a_, 104_a_, 108_a_) can be mounted at suitable surface points or joints of assets (102, 104, 108) or attachments to enable collection of these types of data. As another example, the executable 110_a_ can utilize generator 108 raw data (voltage, amperage) and/or lookup tables (e.g., power rating) to calculate power output in kilowatts per unit of time.

In some implementations, instead of or in addition to performing edge operations, the telematics server 110 can collect, via the controller (102*b*, 104*b*, 108*b*), raw or preprocessed sensor readings. Using raw or preprocessed sensor (102*a*, 104*a*, 108*a*) data, the telematics server 110 can generate electronic API messages 110*b* and transmit the electronic API messages 110*b* to target computing system(s) 120.

The target computing system(s) 120 can include various executables 120*a* structured to enable management and analytics of data about the assets (102, 104, 108). For example, the executables 120*a* can enable sensor monitoring, safety monitoring, real-time or substantially real-time communication, detection of operating conditions, monitoring of mileage, monitoring of fuel consumption, monitoring of weather conditions, wear and tear monitoring, load monitoring and so forth. An example of a target computing system is the asset monitoring system 200 described further herein.

In some implementations, the target computing systems 120 can include AI/ML engines, which can be trained to generate predictions based on the input data received, in the form of API messages 110*b* and/or from other systems, by the target computing system(s) 120. For example, AI/ML models of the AI/ML engines can be trained to generate predictions for fuel consumption levels based on the data that includes asset model identification, asset type, asset attachment identification, asset application/use and duration, and/or asset fuel consumption for particular time periods (hourly, daily, and so forth). As another example, the AI/ML applications can be trained to generate simulations that enable digital twin operations, including, for example, operating condition prediction, object position prediction, and/or prediction of values and operating scenarios using other operating parameters of a particular asset (102, 104, 108) or fleet 106.

The executables 120*a* use specific types of data to perform their intended tasks. Therefore, the API messages 110*b* can include sensor data and/or additional data that augments or supplements the sensor data. For example, the API messages 110*b* (or data collected by the target computing system(s) 120 through other channels) can include service records for assets (102, 104, 108), complaint, defect, and/or recall records for assets (102, 104, 108), part replacement history for assets (102, 104, 108) including part identifiers, and so forth. In some implementations, the target computing system(s) 120 can receive, via API messages 110*b* or otherwise, additional data, such as weather condition data, road traffic monitoring data, road condition monitoring data, elevation data, location data, map data, and so forth. The additional data can be retrieved (e.g., in an API call, through a query, through a dataset or file importation process) or received (e.g., in a targeted or broadcast message) from one or more additional data sources 130.

The API messages 110*b* can be generated by the interface engine 112, which can include one or more web servers/web services engines, one or more endpoints 102*c*, and/or one or more executables (110*a*, 120*a*). The API messages 110*b* can be structured according to a standard (e.g., ISO-15143 or similar) that enables computing systems to exchange telematics data. The API messages 110*b* can include collections of addressable data elements, which can be structured as delimited records (e.g., comma-delimited, semicolon-delimited, space-delimited, and so forth), key-value pairs or nested key-value pairs (e.g., .json), labeled or tagged data or nested labeled/tagged data (e.g., .xml), and/or tabular data (e.g., SQL datasets, Excel datasets, and so forth).

In some implementations, executables 120*a* at target computing system(s) 120 can obtain, update and/or otherwise interact with the data resources in the API messages 110*b* by causing computer-executable commands to be executed and transmitted via a communication channel, such as http, https, and so forth. Accordingly, the telematics server 110, target computing system 120, and/or computing systems described further herein can be identified by a uniform resource locator (URL), and the computer-executable commands can include http operations, such as post (i.e., to create an item at the specified destination), get (i.e. to read an item from a specified destination), put or patch (i.e. to update a portion of an item in the specified destination), and/or delete (i.e. to delete an item in a specified destination).

A particular API message 110*b* can include the attributes sufficient to generate a particular unit of information about the asset (102, 104, 108). The units of information can be provided by a set of corresponding API endpoints 102*c* (digital locations where the interface engine 112 receives requests for specific resources) at the web server. Example units of information, also referred to as API resources, can include snapshot information (e.g., fleet snapshot, equipment status snapshot) and/or time series information (e.g., fault code time series, attachment status time series, sensor image time series).

Fault code time series can include items such as fault code identifier, description, severity, source system, reported date/time and so forth. Location time series can include items such as latitude, longitude, altitude, date/time and so forth. Switch status time series, attachment status time series, and/or engine condition time series can include items such as asset on/off status, part number (e.g., engine number, switch number, attachment part identifier), date time, and so forth. The operating hours time series, idle operating hours time series, fuel used time series, and/or remaining fuel time series can include items such as value, date/time and so forth. Various additional time series data, such as distance, fuel remaining (e.g., value, percentage), diesel exhaust fluid remaining (e.g., value, percentage) and so forth can be included.

The snapshot information messages can include cumulative and/or point-in-time data for any of the above time series data items for a particular asset (102, 104, 108) or a fleet 106 of assets (102, 104, 108). An example fleet snapshot can include information for a set of assets (102, 104, 108) in a particular fleet 106. A fleet snapshot message 110*b* can include, for example, header information containing a fleet identifier, asset identifiers, and/or asset information (OEM, model, equipment type, equipment identifier, serial number and so forth). An asset snapshot message 110*b* can include, for example, header information including asset information.

Various communication arrangements are contemplated herein. For example, in some implementations, the telematics server 110 and/or the web server 102*b* of the telematics server 110 can be bypassed, and the target system 120 can receive electronic messages directly from the asset (102, 104, 108). For example, the target system 120 can include a diagnostic and/or monitoring application that can be communicatively coupled to components of the asset (e.g., ECU, CAN, other asset controllers, asset sensors). As another example, the telematics server 110 and/or the web server 102*b* of the telematics server 110 can be bypassed when the target system 120 obtains additional data from the additional data source 130, and the target system 120 can communicate directly with the additional data source 130. As yet another example, the target system 120 can be one of a plurality of target systems, where each target system is configured to receive information from a particular fleet 106 or a subset of assets in a fleet 106 (e.g., where the target systems 120 are associated with specific dealers for a particular OEM). As yet another example, the target system 120 can be configured to receive and process data from a plurality of telematics servers 110 or assets in fleets 106 (e.g., where the target system 120 is maintained by an entity other than a particular OEM and/or can accommodate data from a plurality of OEMs).

Asset Maintenance Events

Figure 1B:
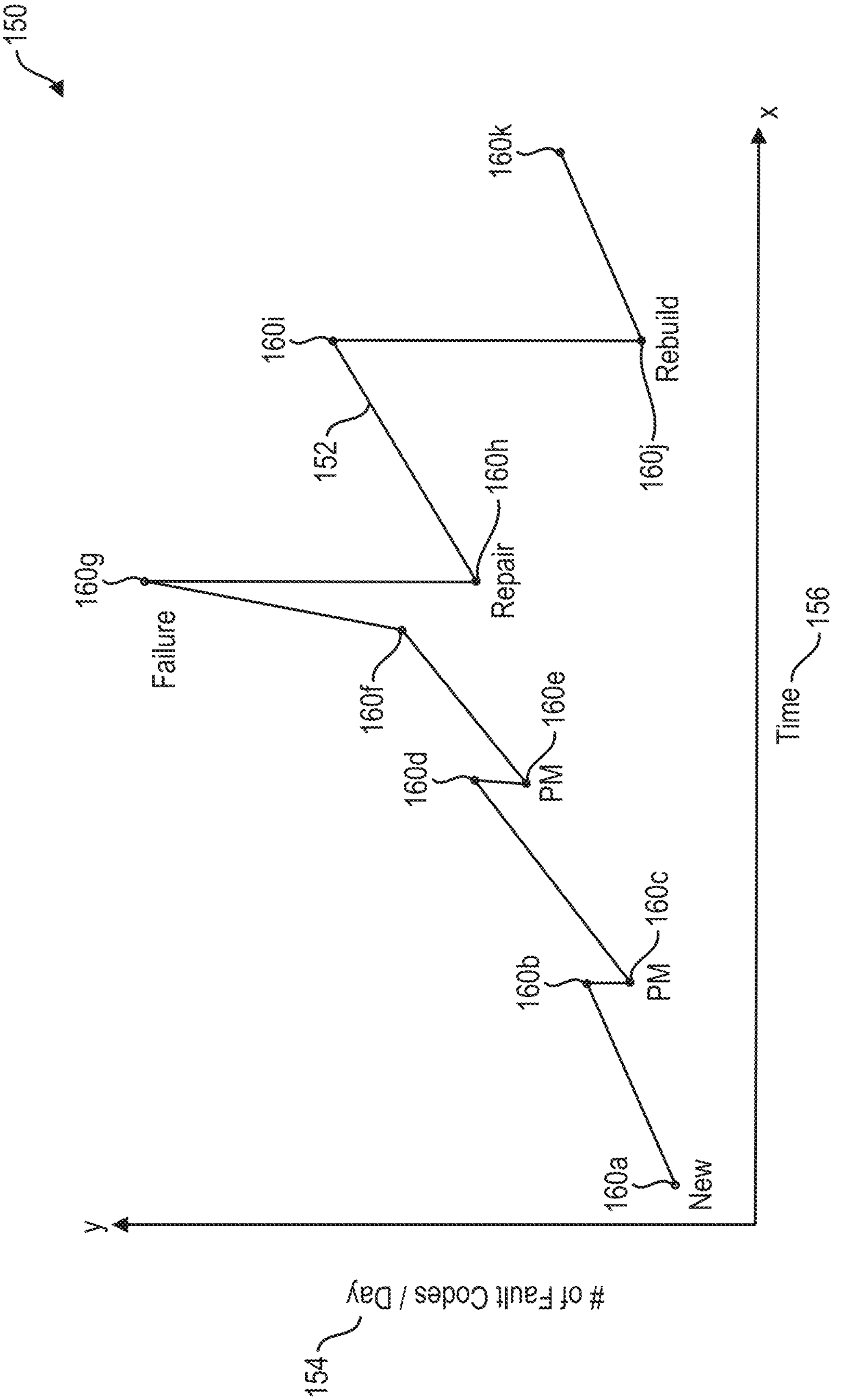
FIG. 1B shows an example pattern of asset maintenance events, where the events are correlated to a subset of telematics data for an asset (e.g., fault codes).

FIG. 1B shows an example pattern 150 of asset maintenance events (160*a*-160*k*) for an example asset (102, 104, 108) of FIG. 1A. In the example shown, the events (160*a*-160*k*) are plotted against a subset of telematics data for the asset. Here, the summarized subset of telematics data includes a count of fault codes 154 per day, but another suitable time period (e.g., second, minute, hour, 6 hours, week) can be used.

The events can be maintenance- and/or lifecycle-related events, such as "new asset", "preventative maintenance", "failure", "repair", and/or "rebuild". As discussed further herein, the asset monitoring system 200 of FIG. 2A can generate AI/ML features using raw telematics data and/or supplemental data, such as repair data, invoice data, weather data, location condition data, and so forth. The asset monitoring system 200 can use the generated features to classify items in raw data, identify patterns, such as the pattern 150, and generate predictions and/or visualizations using the patterns.

Accordingly, the example pattern 150 can include any of actual historical data, inferences about historical data points, such as imputed event types and timing for unknown maintenance events, and/or predicted future data points.

The fault codes 154 can be conceptualized as alphanumeric entities that encode or define error messages related to troubleshooting and monitoring of components of a particular asset (102, 104, 108). In some implementations, the fault codes 154 can be asset-native (OEM-specific). In some implementations, the fault codes 154 can be diagnostic trouble codes from a fault code repository where data is organized in accordance with a mobility engineering standard (e.g., Society of Automotive Engineers' (SAE) J1939-73 standard).

In some implementations, the fault codes 154 can be parsed from diagnostic messages received by the platform. For instance, the ECU or another controller of the asset can be configured to generate and transmit, to the platform, periodic diagnostic messages based on the data received at the ECU or another controller from asset components via a CAN of the asset. The periodic diagnostic messages can include diagnostic trouble codes as concatenations or collections of fields. The fields can include error information, such as the suspect parameter numbers, failure mode identifiers, and/or occurrence counts. In addition to the diagnostic trouble codes, the diagnostic messages can include source component addresses or identifiers that can identify the source components or parts where the errors originated. The suspect parameter numbers can identify specific locations (e.g., circuits) of parts where faults occurred. The failure mode identifiers can identify the reasons the fault flags were raised, such as voltage above/below normal, current above/below normal, component not responding properly, abnormal frequency, abnormal pulse rate, abnormal update rate, abnormal rate of change, data error, and so forth (for example, in accordance with a suitable J1939 ontology). The occurrence count can correspond to a total count of instances, per period of time, for a particular suspect parameter number, failure mode identifier, or combination thereof.

The fault code 154, shown in FIG. 1B, can be a representation of any of the above items, which can be parsed from diagnostic error messages. In some implementations, fault codes 154 can be roll-ups (aggregations that can include mean values, mode values, total values) of parsed items (e.g., transmission errors, engine errors, braking system errors, and so forth). In some implementations, the roll-ups can be generated by the platform according to an ontology (e.g., an ontology stored in the data store 232), which can be asset-type specific, asset-specific, customer-specific, location-specific, job-site specific, dealer-specific, part-specific, utilization-specific, and so forth.

In some implementations, the ontology can be selected (e.g., automatically selected) based on supplemental data, such as asset utilization data, asset location data, weather data, or other operating condition data. For example, an asset utilization mode (e.g., digging, drilling) of a particular asset can be inferred by parsing additional telematics data to determine an attachment utilized in conjunction with the asset at the time the error was raised. The determined asset utilization mode can drive the selection process for an ontology that provides a desired level of granularity for components, such as higher-level granularity for error codes associated with attachments, motors, and so forth in heavy-duty operations.

As another example, a GPS sensor disposed on the asset can be utilized to capture and automatically provide, to the platform, geographical coordinates (e.g., latitude, longitude) of the asset. The platform can correlate the location data with local weather reports or forecasts and automatically select an ontology that provides a comparatively higher level of granularity for error codes associated with failure points under specific operating conditions (e.g., temperature sensors, such as engine-out exhaust temperature sensors or DEF temperature sensors for assets operating in below-freezing outside temperatures).

More generally, various implementations can utilize telematics data and/or supplemental data to determine (e.g., parse) or generate the fault codes 154 or their roll-ups. For example, in some use cases, the additional telematics data can include readings of sensors (102*a*, 104*a*, 108*a*), such as temperature sensors, pressure sensors, and so forth. In some use cases, the additional telematics data can include diagnostic data generated or transmitted by an on-board diagnostics tool, such as a tool communicatively coupled to one or more of the asset controllers for diagnostic or monitoring purposes.

Asset Monitoring System

Figure 2A:
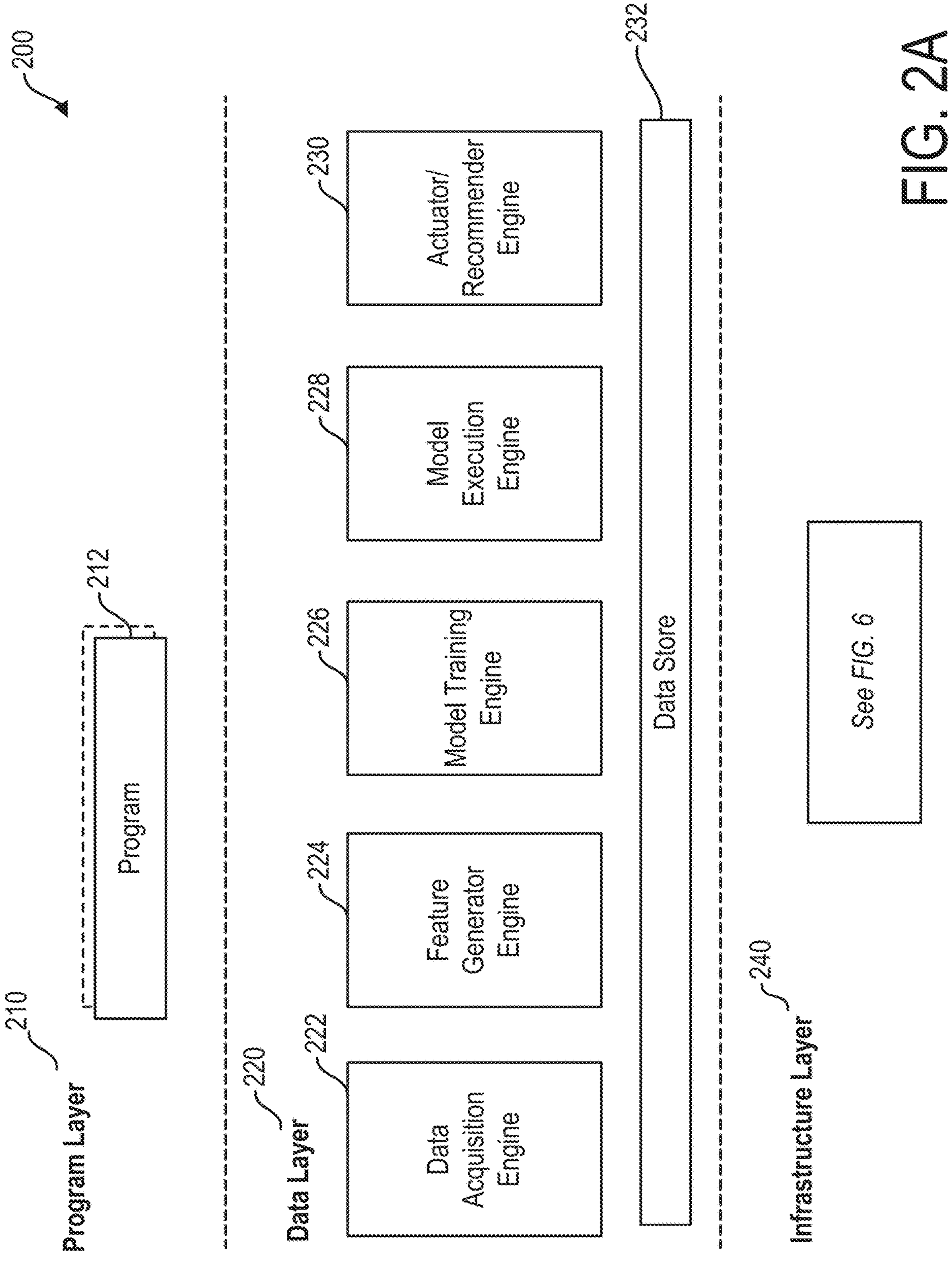
FIG. 2A shows an example asset monitoring system.

FIG. 2A shows an example asset monitoring system 200. The asset monitoring system 200 enables identification and prediction of equipment (asset) maintenance events. For example, the asset monitoring system 200 can be utilized to obtain telematics, sensor, and/or supplemental data from assets (102, 104, 108) of FIG. 1A, generate model input features using the data, use the generated features to train AI/ML models to classify, identify, or predict maintenance events, execute the trained AI/ML models on additional data to classify, identify, or predict maintenance events, and generate recommendations or asset control commands based on the data.

The asset monitoring system 200 can be deployed in a cloud-based or on-premises manner. In some implementations, multiple instances of the asset monitoring system 200 can be deployed in a software-as-a-service (SaaS) mode.

Such instances of the asset monitoring system 200 can share various physical and/or virtualized computing resources, such as storage, memory, and/or processors. Additionally or alternatively, in certain arrangements, one or more components of the asset monitoring system 200 can be implemented on-board of the host equipment (e.g., as part of the controllers (102*b*, 104*b*, 108*b*)). Accordingly, operations described herein can be performed, in whole or in part, locally or remotely in relation to the host piece of equipment. Furthermore, the operations described herein can be performed locally or in a distributed, multiple-node fashion with respect to the quantity and geographical location of computer processors utilized to perform the operations.

As shown according to an example of FIG. 2A, the asset monitoring system 200 can include a program layer 210, a data layer 220, and an infrastructure layer 240. Together, these layers can form an asset monitoring system 200 stack, which includes particularly configured hardware and software components structured to enable computer-based operations of the asset monitoring system 200.

The program layer 210 can include one or more programs 212. An example program 212 can classify, identify, or predict asset maintenance events as described herein. More generally, programs 212 can include on-board executables or circuitry, web-based applications, desktop applications, and/or mobile applications and can enable the asset monitoring system 200 to be accessible from a variety of computing devices, including on-board control panels, on-board computers, desktop computers, smartphones, tablets, diagnostic devices (e.g., on-board diagnostics (OBD) code readers and/or scan tools), and so forth. The programs 212 can be structured to perform various tasks that access on-board sensor data and/or use telematics data, for example, in the form of API messages 110*b* of FIG. 1A. For instance, the programs 212 can be structured to perform asset safety monitoring (e.g., through object detection using various sensor images associated with the asset), bidirectional asset communication, detection of asset operating conditions, monitoring of asset mileage, monitoring of asset fuel consumption, monitoring of weather conditions in a particular asset deployment area, asset wear and tear monitoring, asset load monitoring, asset performance modeling (e.g., via digital twin techniques), monitoring of asset power output, and so forth. In various implementations, the programs 212 can be deployed and/or managed by an OEM associated with a particular asset, a customer of the OEM (e.g., a dealer), and/or a third party relative to the OEM and/or the customer of the OEM.

The data layer 220 can include various engines and/or data stores that enable data services and/or data access. Generally, various engines at the data layer 220 execute operations that organize, manage, share, compute, and/or enhance various data items stored in the data store(s) 232. The stored items can include telematics data, vector data, embeddings, ontologies, features, outputs, models, and so forth. The engines can include executables that enable data generation, processing, analytics, storage, retrieval, and/or visualization. The data store(s) 232 can be implemented in various suitable forms, such as look-up tables or other data structures encoded in on-board memory units, local file systems, network file systems (NFS), database management systems (DBMS), relational DBMS, database file systems (DBFS), distributed ledgers, vector databases, and so forth. Units of data in the data store(s) 232 can be stored in various forms, such as files (e.g., .xml, .json), database tables, embeddings, and/or distributed ledger blocks. As such, the data store(s) 232 can utilize various data storage techniques, including file storage, object storage, content-addressed storage, vector storage, and/or block storage.

As shown, example engines at the data layer 220 can include a data acquisition engine 222, feature generator engine 224, model training engine 226, model execution engine 228, and/or actuator/recommender engine 230. The data acquisition engine 222 can access or receive telematics or sensor data, as described earlier. In some implementations, the data acquisition engine 222 can include one or more asset controllers and/or can perform data pre-processing operations. The data pre-processing operations can include data normalization, data aggregation, generation of virtual sensor values, imputation of missing values in a sequence of sensor readings, and so forth. In some implementations, the data acquisition engine 222 can further include, at least in part, the interface engine 112.

Figure 2B:
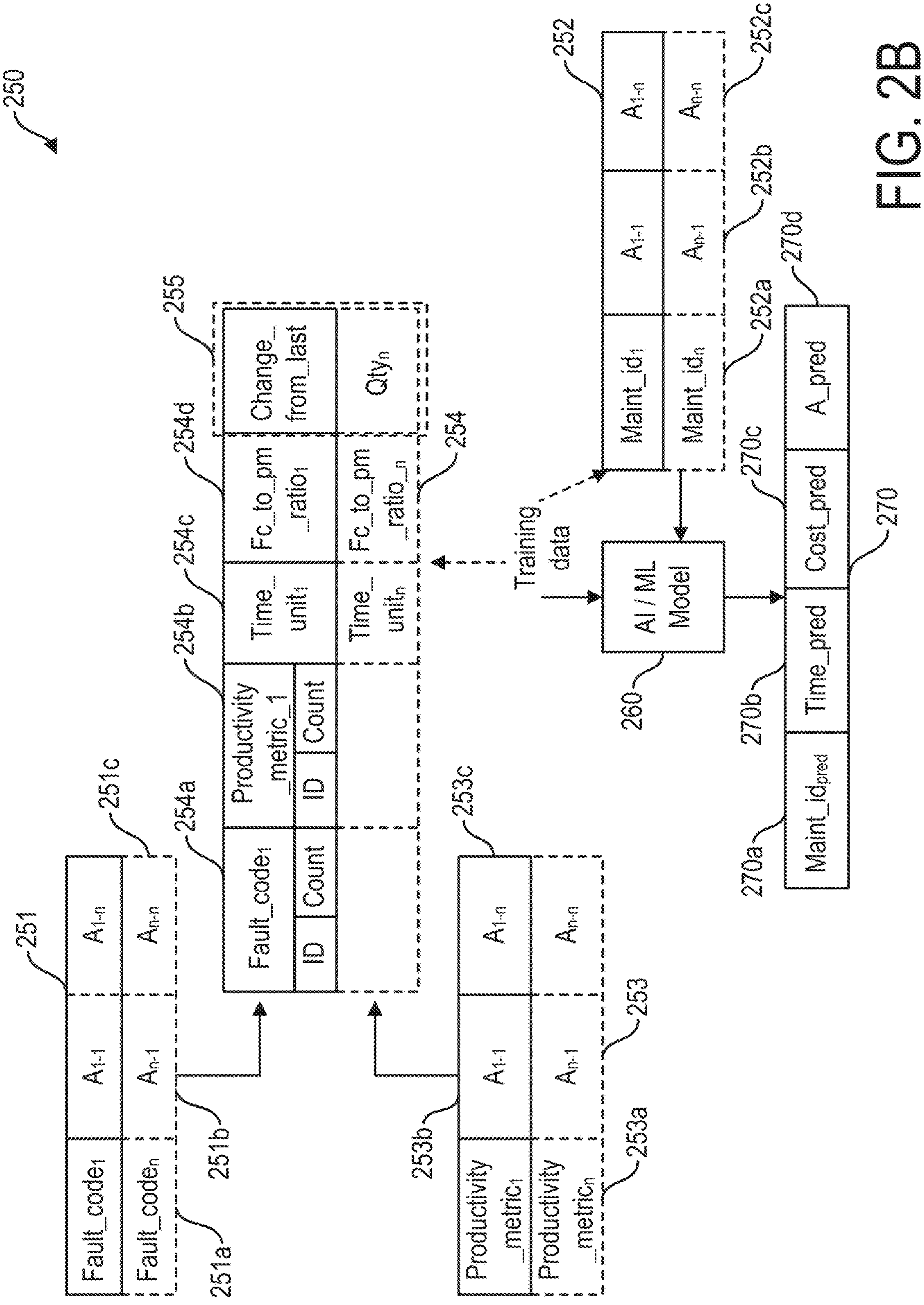
FIG. 2B shows an example data flow diagram for AI/ML subsystems of the asset monitoring system.
Figure 3:
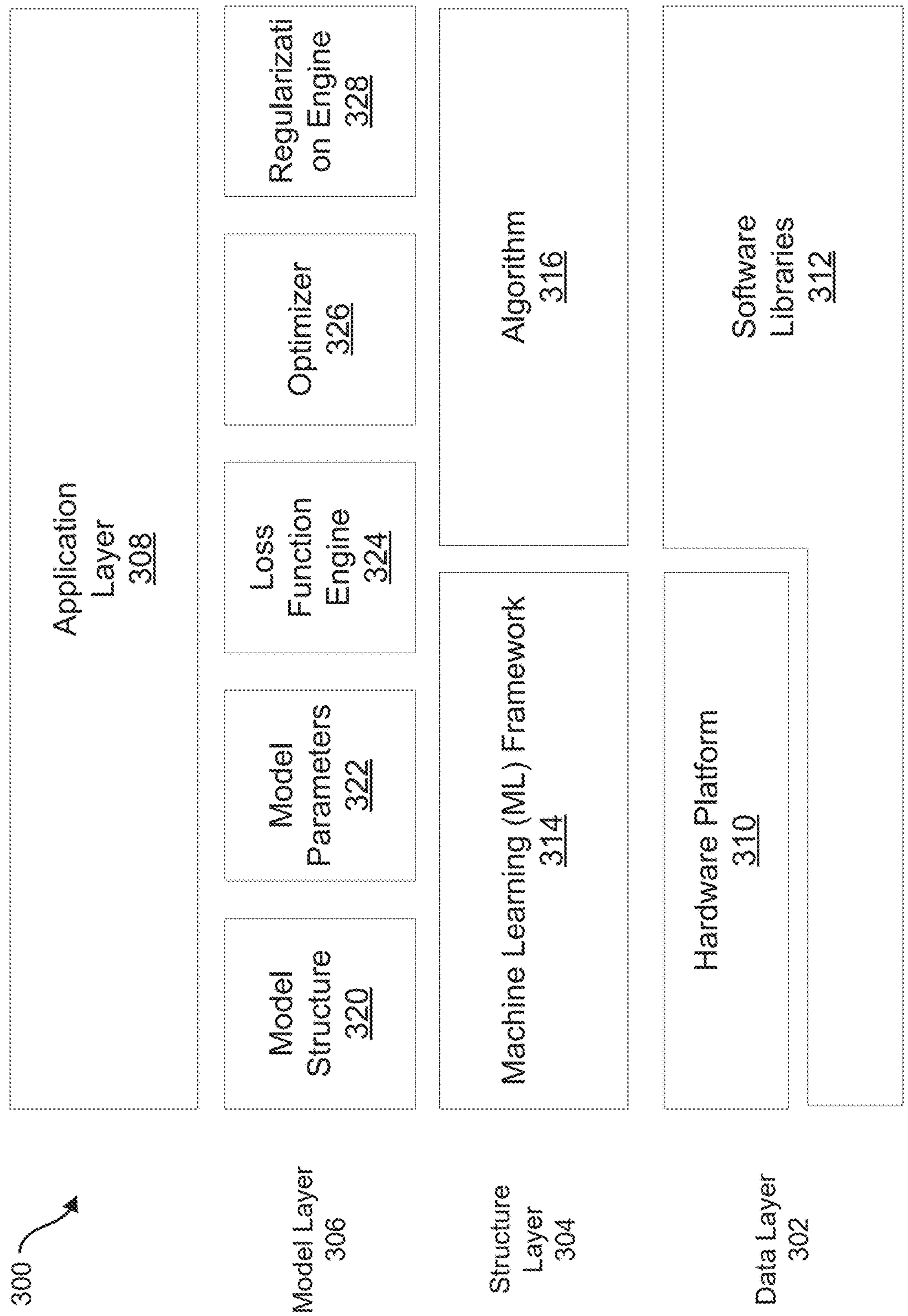
FIG. 3 shows an example implementation of AI/ML subsystems of the asset monitoring system.

Any or all of the feature generator engine 224, model training engine 226, and/or model execution engine 228 can, in whole or in part, comprise an AI/ML subsystem to classify, identify, or predict asset maintenance events, as described in more detail with respect to FIG. 2B and FIG. 3.

For instance, the feature generator engine 224 can perform various transformations (data fusing operations) on raw or pre-processed data received via the data acquisition engine 222. The data fusing operations can include data optimization operations to improve semantic value of the data. The data optimization operations can include data mapping, identification of ontologies, referencing of ontologies, data consolidation (e.g., generation of entities that combine fault data and productivity/operating condition data), and so forth. The data fusing operations can also include structural optimization of input features for the AI/ML algorithms to improve performance and reduce computing loads on the AI/ML models. For example, the number of fields in a particular feature map can be set to a certain maximum value, field values (e.g., change from last period 255) can be pre-computed, relational data structures can be denormalized (for example, multiple data sets 251 and 253 can be reduced to a data set 254), feature values can be vectorized (transformed into sets of numerical values, also sometimes referred to as embeddings) to facilitate comparison operations, and so forth.

The model training engine 226 can enable further improvements in AI/ML model performance through model training. For example, the models can be trained using the generated features to recognize patterns in the data and automatically classify the data, as described further herein. The models can also be trained, using additional data, such as maintenance data, to correlate input items in the feature sets with maintenance events determined based on maintenance data. The AI/ML models can therefore learn that certain patterns in data can correspond to known maintenance events. For example, DEF filter error code counts can decrease by over a certain threshold amount (e.g., 80%) after a known preventative maintenance event of DEF filter replacement. The models can therefore learn to generate inferences regarding the nature and timing of unknown maintenance events based on the detected patterns, even if no maintenance data is available.

The model execution engine 228 can apply (execute) the trained AI/ML models on the features generated by the feature generator engine 224, as described below. In some implementations, a set of AI/ML models are arranged in a sequence. For example, a first AI/ML model can be an imputer model configured to fill in missing sensor readings. A second AI/ML model can be a transformer, foundation model and/or LLM or another neural network trained to generate an output map that includes predictions regarding maintenance activities and their timing for past (non-OEM) and/or future maintenance activities, such as predictions 270. A third AI/ML model can be a classification model trained to classify events in predictions 270 (e.g., to classify the predicted maintenance- and/or lifecycle-related events as "new asset", "preventative maintenance", "failure", "repair", and/or "rebuild", as shown in FIG. 1B, or to generate another classification that enhances semantic value of the generated predictions). The above is an illustrative example, and other arrangements of AI/ML models are contemplated herein. For instance, imputation of sensor values or productivity metrics can be bypassed or performed by the second AI/ML model. Classification of the generated outputs can also be bypassed or performed by the second AI/ML model. As such, one or more AI/ML models can be used to implement the techniques described herein.

As shown, FIG. 2A includes an actuator/recommender engine 230. In some implementations, the actuator/recommender engine 230 can generate, based on the output of the model execution engine 228, an electronic instruction and send the electronic instruction to a controller (102*b*, 104*b*, 108*b*) of a particular asset, which can alter or stop operation of the asset (e.g., stop the engine, reduce revolutions-per-minute, place the asset in neutral, forward or reverse, or perform another autonomous operation). In some implementations, the actuator/recommender engine 230 can generate and display, at a computing device (e.g., as part of the program 212) a user interface that can include a recommendation. The recommendation can include one or more recommended actions. For example, the recommendation can include a set of maintenance schedules, corresponding asset downtime estimates, corresponding part costs, corresponding downtime costs, and so forth. The maintenance schedules can include options generated based at least in part on one or more of: (i) the asset's actual past utilization pattern, (ii) the asset's inferred/imputed past utilization pattern, (iii) the asset's predicted future utilization pattern, (iv) manufacturer-recommended base maintenance schedule for an asset of the same or similar type or class, (v) an actual past maintenance history of the asset determined using maintenance data, or (vi) an inferred/imputed past maintenance history of the asset. In some implementations, the maintenance schedule options are generated based on data for a group of assets. In some implementations, individual asset or asset operator/owner identifiers are anonymized.

In some implementations, the user interface can further include maintenance option purchase or upgrade (e.g., buy-up) controls, which enable users to enroll in new maintenance plans, switch existing maintenance plans, and/or upgrade existing maintenance plans. In some implementations, the user interface can further include this option for a set of assets in a particular fleet, where the set can include more than one assets. According to various implementations, the maintenance plans can include one or more of remote diagnostic/troubleshooting plans, on-site diagnostic/troubleshooting plans, parts replacement plans, parts maintenance/service plans, asset service plans, and so forth.

AI/ML Subsystem(s) of the Asset Monitoring System

The asset monitoring system 200 can include one or more AI/ML subsystems, which can include trained AI/ML models that classify, identify, or predict asset maintenance events. In an example implementation, an AI/ML subsystem can include one or more of the feature generator engine 224, model training engine 226, and/or model execution engine 228. However, these items or components thereof can be omitted, duplicated, or combined, according to various implementations.

FIG. 2B shows an example data flow diagram 250 for AI/ML subsystems of the asset monitoring system. As a high-level overview, assets maintained outside of OEM service networks can provide telematics data to OEM computing systems. By establishing a correspondence between sensor data (e.g., fault code dataset 251) and the occurrence of known maintenance events (e.g., maintenance data 252, such as data from maintenance/service systems, invoice data, and so forth), the system can generate maintenance-related predictions. The accuracy of maintenance-related predictions can be further improved by considering asset utilization information (e.g., productivity dataset 253). For example, utilization information can describe utilization patterns for an asset or group of assets (e.g., travel, grading, idle, and so forth). Utilization information enables the system to accommodate different use cases in order to not mistake changes in asset utilization for performance of maintenance. Accordingly, the use of utilization information can reduce the number of false positives in imputing past maintenance events or predicting/recommending future maintenance events and their timing.

As shown, the fault code dataset 251 can include a set of fault codes 251*a* and their attributes 251*b* (source, severity, timing, and so forth). In an example use case, the fault codes can correspond to an asset, such as a genset. Other examples of fault codes include items extracted or generated based on diagnostic monitoring information, sensor values, on-board diagnostic codes, fluid sample results, and so forth. The productivity dataset 253 can include a set of utilization descriptors 253*a* and utilization attributes 253*b* (utilization values, utilization parameters, attachment identifiers, geographical locations, and so forth). In the example use case, the utilization descriptors and values can describe the amount of electricity (e.g., in kilowatts-per-hour) generated by the genset. Other examples can include fuel burn, pressure sensor readings, load size, pushing force used, and so forth. The maintenance dataset 252 can include a set of known maintenance events 252*a* and their descriptors 252*b*.

In an example use case, the asset monitoring system 200 can generate the feature map 254 using items from the fault code dataset 251 and the productivity dataset 253. The feature map can be used in an AI/ML model to predict maintenance events. The feature map can include raw data values parsed from the source data, transformed values (e.g., counts, roll-ups, averages), time units (e.g., roll-ups for time ranges, such as 10:00 AM-10:59 AM on a particular date, 11:00 AM-11:59 AM, dates, weeks, and so forth), observation-level normalization values 254*d* (e.g., ratios of fault code counts to asset productivity values per time period, such as fault codes per kilowatt-hour), and/or time-series normalization values (e.g., a change in the ratio of fault codes to asset productivity values for a time period relative to the previous time period). Although shown as a singular entity, the feature map can include multiple entities, such as multiple related datasets. Accordingly, the feature map can be conceptualized in any suitable form, such as one or more tables (e.g., relationally-linked tables), records, datasets, key-value pairs, metadata-enhanced items, and so forth. The feature map 254 can also include vectorized items, such as embeddings. Various items from the feature map 254 can be stored, in whole or in part, across various types of data stores, such as flat files, relational databases, and/or vector databases. Accordingly, the feature map 254 can be a logical and/or distributed entity and can be persisted in whole or in part.

The feature map 254 and/or the maintenance data 252 can be used to train the AI/ML model(s) 260 of the asset monitoring system 200, as described further herein. The trained AI/ML model(s) 260 can be applied to additional data (251, 253) to generate imputations or predictions based on the data. Continuing the example, the trained AI/ML model(s) 260 can predict and/or estimate the maintenance events 270*a* and maintenance event timing 270*b*. In some implementations, the trained AI/ML model(s) 260 (e.g., the same model or a different, downstream model) can generate predictions for additional attributes of the predicted maintenance events 270*a*, such as maintenance event classifications 270*d* (e.g., "new asset", "preventative maintenance", "failure", "repair", and/or "rebuild"). In some implementations, trained AI/ML model(s) 260 and/or other programs can be executed to generate estimates for additional attributes, such as maintenance cost 270*c*, maintenance plan recommendation, maintenance plan pricing, and so forth.

Although the outputs of the trained AI/ML model(s) 260 are shown as a singular item 270, one of skill will appreciate that various portions of the output 270 can be structured as distinct data entities, which can be linked via reference identifiers, indexes, metadata, tags, key-value pairs, or in another suitable manner. The outputs can be further processed by the actuator/recommender engine 230 of the asset monitoring system 200.

FIG. 3 shows an example implementation of AI/ML subsystems of the asset monitoring system. FIG. 3 illustrates a layered architecture of an artificial intelligence (AI) system 300 that can implement the machine learning models of the model execution engine 228 of the asset monitoring system 200, in accordance with some implementations of the present technology.

As shown, the AI system 300 can include a set of layers, which conceptually organize elements within an example network topology for the AI system's architecture to implement a particular AI model. Generally, an AI model is a computer-executable program implemented by the AI system 300 that analyses data to make predictions. Information can pass through each layer of the AI system 300 to generate outputs for the AI model. The layers can include a data layer 302, a structure layer 304, a model layer 306, and an application layer 308. The algorithm 316 of the structure layer 304 and the model structure 320 and model parameters 322 of the model layer 306 together form an example AI model. The optimizer 326, loss function engine 324, and regularization engine 328 work to refine and optimize the AI model, and the data layer 302 provides resources and support for application of the AI model by the application layer 308. The application layer 308 can include, in whole or in part, the model execution engine 228 of the asset monitoring system 200. For example, the model execution engine 228 can provide the feature map 254 or other feature data to one or more trained AI models described herein and can cause (e.g., by executing an instruction set or prompt using the framework 314) the AI model to execute.

The data layer 302 acts as the foundation of the AI system 300 by preparing data for the AI model. As shown, the data layer 302 can include two sub-layers: a hardware platform 310 and one or more software libraries 312. The hardware platform 310 can be designed to perform operations for the AI model and include computing resources for storage, memory, logic and networking. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 310 can include Infrastructure as a Service (IaaS) resources, which are computing resources, (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM. The hardware platform can, in whole or in part, be included in or accessible to the devices of the infrastructure layer 240 of the asset monitoring system 200.

The software libraries 312 can be thought of as suites of data and programming code, including executables, used to control the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include Intel Math Kernel Library, Nvidia cuDNN, Eigen, and Open BLAS.

The structure layer 304 can include an ML framework 314 and one or more of an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that can work with the layers of the AI system facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Keras, Cafffe, LightGBM, Random Forest, and Amazon Web Services.

The algorithm 316 can be an organized set of computer-executable operations used to generate output data from a set of input data and can sometimes be described using pseudocode. The algorithm 316 can include complex code that allows the computing resources to learn from new input data and create new/modified outputs based on what was learned.

The algorithm 316 can build the AI model through being trained (e.g., via the model training engine 226, which can include a user interface having controls sufficient to enable a user to interact with the model, label data, and so forth) while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, and/or reinforcement learning.

Using supervised learning, the algorithm 316 can be trained to learn patterns (e.g., map input data to output data) based on labeled training data, such as feature sets 254 and/or maintenance data 252. The training data may be labeled by an external user or operator. The user may label the training data with identifiers of one or more classes (e.g., monitoring categories, maintenance activity types, repair activity types, maintenance event classifications) and train the AI model by inputting the training data (e.g., via the user interface of the model training engine 226) to the algorithm 316. The algorithm determines how to label the new data, such as items from additional data sets (251, 252, 253, 254) and/or their corresponding outputs 270, based on the labeled training data.

The user can facilitate collection, labeling, and/or input via the ML framework 314. In some instances, the user may convert the training data to a set of feature vectors for input to the algorithm 316. For example, the system may vectorize any of the items in (251, 252, 253, 254) to facilitate item comparisons via techniques such as semantic search. Once trained, the user can test the algorithm 316 on new data to determine if the algorithm 316 is predicting accurate labels for the new data. For example, the user can use cross-validation methods to test the accuracy of the algorithm 316 and retrain the algorithm 316 on new training data if the results of the cross-validation are below an accuracy threshold.

Supervised learning can involve classification and/or regression. That is, the algorithm 316 can be a classification- and/or regression-based algorithm. Classification techniques involve teaching the algorithm 316 to identify a category of new observations based on training data and are used when input data for the algorithm 316 is discrete. Said differently, when learning through classification techniques, the algorithm 316 receives training data labeled with categories (e.g., classes) and determines how features observed in the training data relate to the categories. Once trained, the algorithm 316 can categorize new data by analyzing the new data for features that map to the categories, such as maintenance- and/or lifecycle-related events ("new asset", "preventative maintenance", "failure", "repair", and/or "rebuild"). Examples of classification techniques include boosting, decision tree learning, genetic programming, learning vector quantization, k-nearest neighbor (k-NN) algorithm, and statistical classification.

Regression techniques involve estimating relationships between independent and dependent variables and can be used when input data to the algorithm 316 is continuous or time-series. Regression techniques can be used to train the algorithm 316 to predict or forecast relationships between variables. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations. In an example, a particular AI/ML model can be an imputer trained to fill in missing data values (e.g., fault codes, productivity metrics, attributes, time units, calculated values).

The model layer 306 can implement the AI model using data from the data layer and the algorithm 316 and ML framework 314 from the structure layer 304, thus enabling decision-making capabilities of the AI system 300. The model layer 306 can include any of a model structure 320, model parameters 322, a loss function engine 324, an optimizer 326, and a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 322 represent the relationships learned by a model during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be automatically determined and/or altered during training of the algorithm 316.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function. The loss function may be presented via the ML framework 314, such that a user can determine whether to retrain or otherwise alter the algorithm 316 if the loss function is over a threshold. In some instances, the algorithm 316 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the data layer 302.

The regularization engine 328 executes regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constrain the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problem or perform tasks. In an example implementation, the application layer 308 can include one or more programs 212. For example, the application layer 308 can include executables and/or user interfaces to classify, identify, or predict asset maintenance events using the AI/ML ecosystem of FIG. 3.

Example Methods for Identifying and Predicting Asset Maintenance Events

Figure 4:
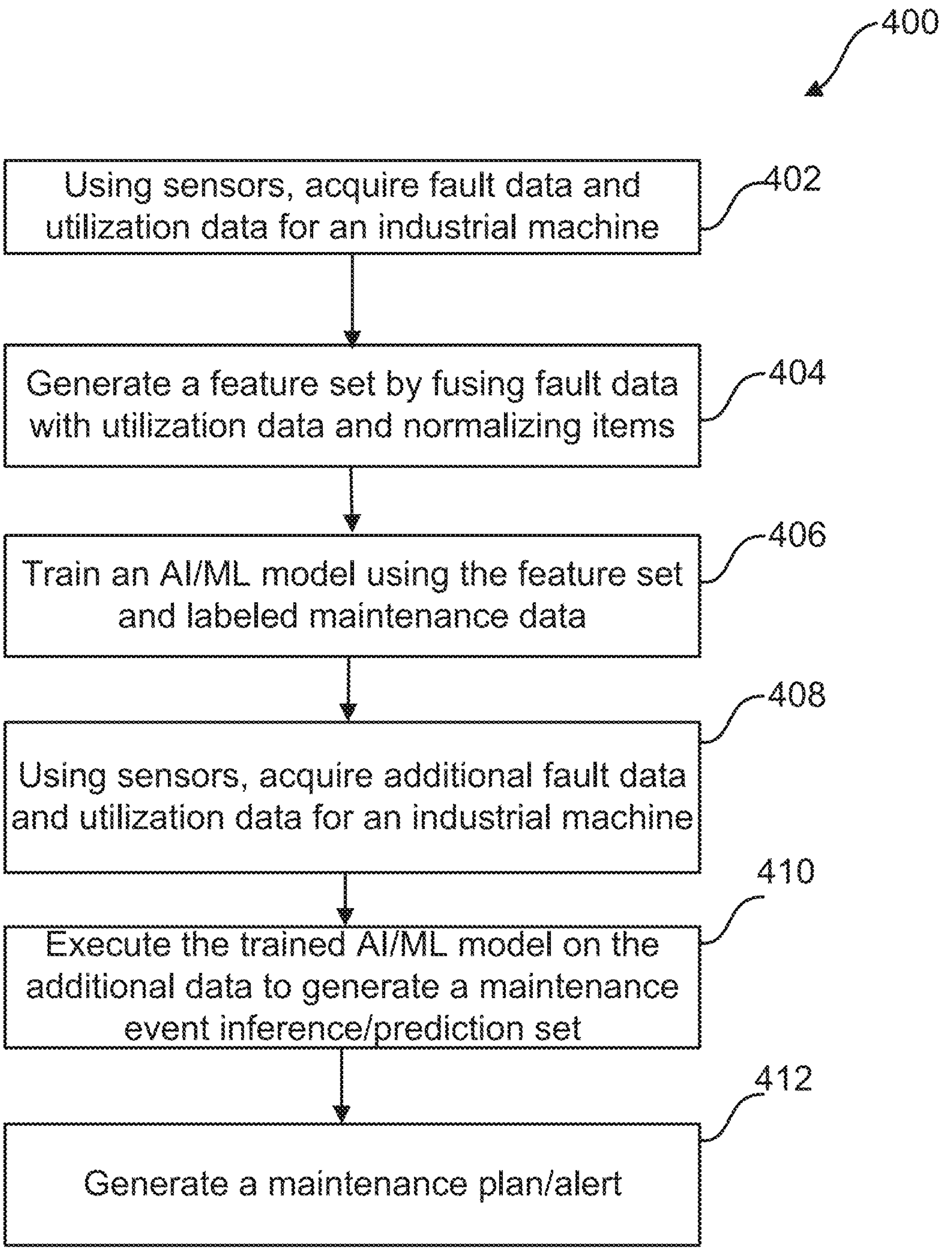
FIG. 4 shows a flowchart of a method for identifying and predicting asset maintenance events using the asset monitoring system.

FIG. 4 shows a flowchart of a method 400 performed using the asset monitoring system 200 of FIG. 2A. A hardware or software processor executing instructions described in this application can perform the operations described herein. One of skill will appreciate that operations can be omitted, combined, and/or substituted without departing from the spirit of the invention.

In operation of the asset monitoring system 200, at step 402, the system can acquire (e.g., by using sensor readings, by using telematics data, by retrieving previously stored historical fault code data, in native or aggregated form, from a database, or by receiving data from an auxiliary data source), a first fault code dataset. The first fault code dataset can be generated by sensors disposed on an industrial machine, such as earth-moving machinery, construction machinery, or power-generation machinery. The system can also acquire utilization data for the industrial machine.

At 402, the system can generate a feature set for an AI/ML model. For example, the system can transform or modify the first fault code dataset to fuse fault code data with a first utilization dataset for the industrial machine. According to various implementations, the transformation can include generating additional items (e.g., a fault-to-utilization ratio, a fault-to-output ratio, a ratio change metric), normalizing data, filling in missing values, generating fault-code level aggregations, data vectorization, and/or other data transformations or modifications.

In some implementations, the system can selectively generate the fault code dataset to include data for a predetermined set of components associated with an item in the utilization dataset. For example, given a particular mode of utilization (travel, excavation, drilling) or a particular attachment used, as indicated by utilization data, the system can obtain or select readings from a specific set of monitoring sensors that correspond to the affected components. These items or operations can be defined using a retrievably stored ontology.

At 406, the system can enable training of the AI/ML model using the generated training data (i.e. transformed fault code data) in conjunction with labeled maintenance data. For example, the trained AI/ML model can learn to recognize patterns in the fault code data without the use of additional maintenance data (e.g., when the maintenance history of machinery is unknown).

At 408, the system can acquire a second fault code dataset and a second utilization dataset and execute, at 410, the AI/ML model on the second fault code dataset and second utilization dataset to generate a maintenance event prediction set. In some implementations, the industrial machine is a first industrial machine, and the second fault code dataset and the second utilization dataset pertain to a set of industrial machines that includes one or more industrial machines different from the industrial machine. That is, the machine that provides initial training data may or may not be included in the second fault code dataset and/or the second utilization dataset, such that the AI/ML model can be made applicable across assets of a similar type or with a similar utilization pattern.

At 412, the system can use the maintenance event prediction set to generate a maintenance plan. The maintenance event prediction set can include inferences about past maintenance events, predictions about future maintenance events, or both. For example, the maintenance event prediction set can include one or more inferences regarding an automatically determined occurrence of a past maintenance event. The inferences can include a past maintenance event descriptor and a past maintenance event time. In another example, the maintenance event prediction set can include an inference regarding an automatically predicted occurrence of a future maintenance event, the inference comprising a future maintenance event descriptor and a future maintenance event time.

In some implementations, the system can automatically generate and cause a computing device to display a notification regarding the maintenance plan. The computing device can be or include one or more of an on-board computing system, an on-board navigation system, or a mobile computing device communicatively coupled to the one or more industrial machines. Advantageously, such communication enables individuals responsible for asset maintenance to take action on the proposed maintenance plans. For example, in some implementations, the notification can include a user-interactive control to enable the user to subscribe to the maintenance plan or modify the maintenance plan.

Example Computer Systems and Networks

Figure 5:
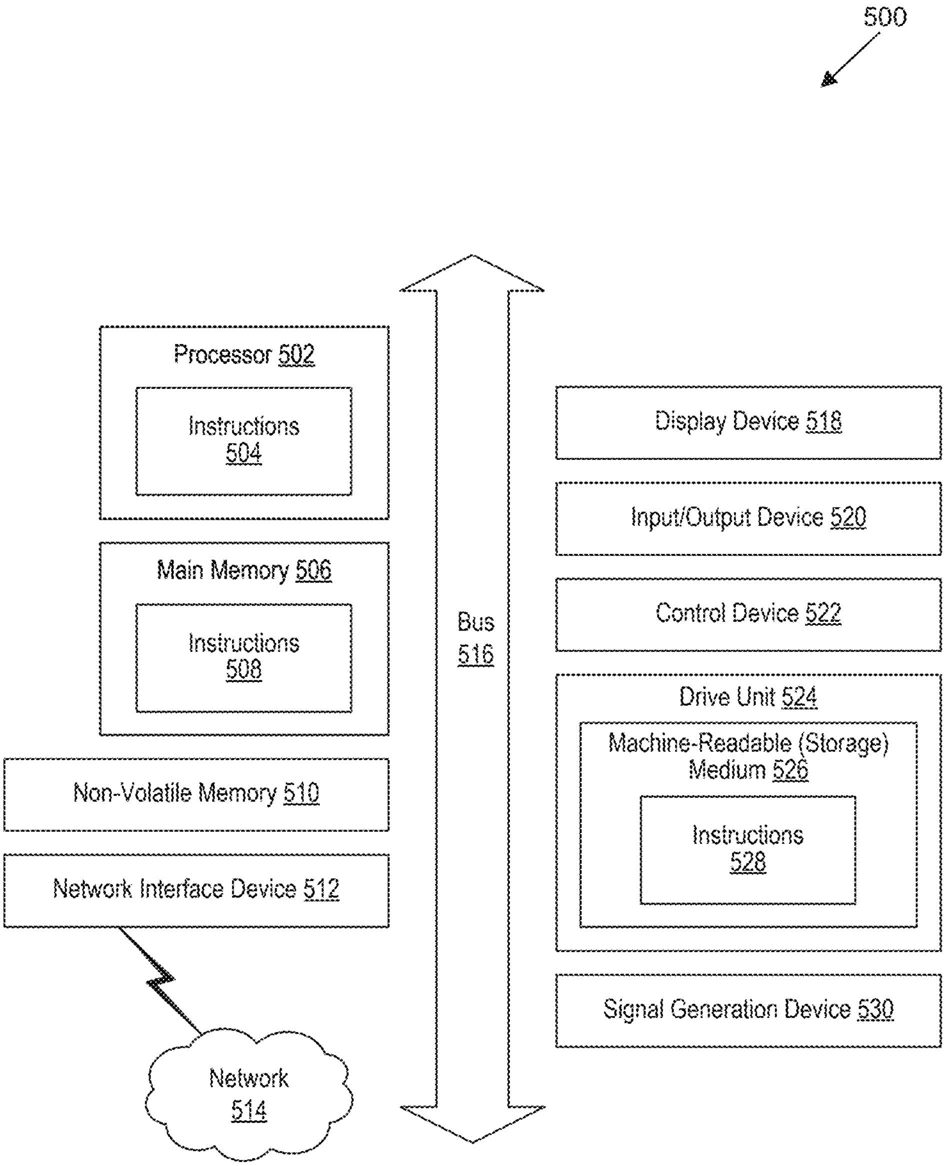
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the Figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Figure 6:
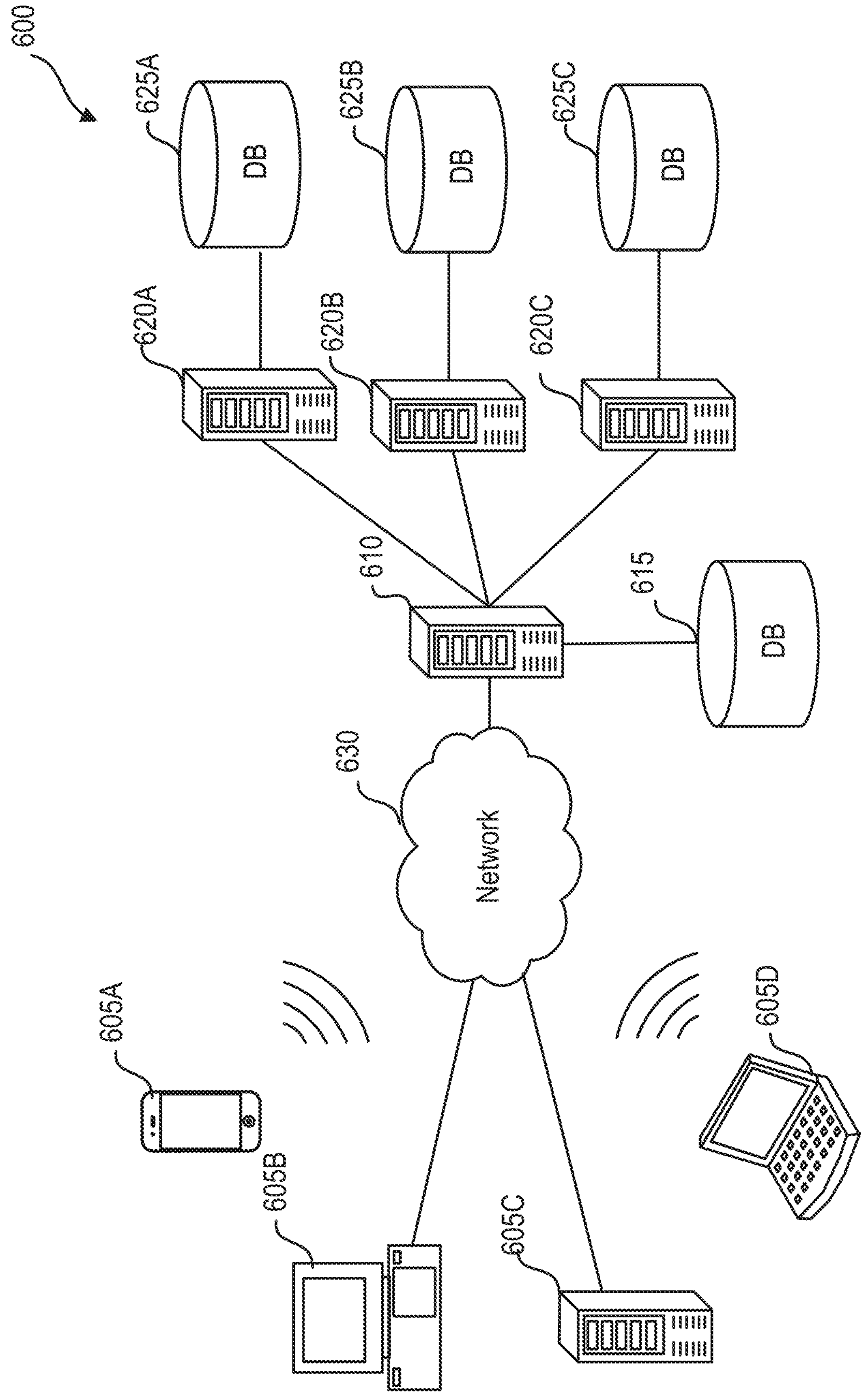
FIG. 6 is a system diagram illustrating an example environment in which the platform operates in some implementations.

FIG. 6 is a system diagram illustrating an example of a computing environment in which the disclosed platform operates in some implementations. In some implementations, environment 600 includes one or more client computing devices 605A-D, examples of which can host systems described herein. Client computing devices 605 operate in a networked environment using logical connections through network 630 to one or more remote computers, such as a server computing device.

In some implementations, server 610 is an edge server which receives client requests and coordinates fulfillment of those requests through other servers, such as servers 620A-C. In some implementations, server computing devices 610 and 620 comprise computing systems, such as the target computing system 120 of FIG. 1A, the system 200 of FIG. 2A, and so forth. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server or client devices. In some implementations, servers (610, 620A-C) connect to a corresponding database (615, 625A-C). As discussed above, each server 620 can correspond to a group of servers, and each of these servers can share a database or can have its own database. Databases 615 and 625 warehouse (e.g., store) information such as telematics data, vector data, embeddings, ontologies, features, outputs, models and so forth. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. In some implementations, network 630 is the Internet or some other public or private network. Client computing devices 605 are connected to network 630 through a network interface, such as by wired or wireless communication. While the connections between server 610 and servers 620 are shown as separate connections, these connections can be any kind of local, wide area, wired, or wireless network, including network 630 or a separate public or private network.

Industrial Applicability

Systems and methods are disclosed herein for identifying and predicting maintenance events with respect to assets, such as mobile machinery. A computing platform can include control circuit(s) (on-board and/or remote) configured to acquire machine fault data and machine utilization data. A feature set can be generated by transforming the machine fault data (e.g., by fusing the machine fault data with machine utilization data), normalizing the data, generating embeddings, and/or executing imputation algorithms to fill in missing values. A classifier model can be trained using the transformed machine fault data in conjunction with labeled maintenance event data to enable the trained classifier model to learn to recognize utilization-specific fault code patterns. The trained classifier model can generate inferences and predictions regarding machinery maintenance events without the use of maintenance data. Accordingly, the computing platform can generate utilization- and maintenance-history specific maintenance plans for machinery even when the service history is unknown or incomplete.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for predicting maintenance events for industrial machines, the system comprising:

a set of condition monitoring sensors;

at least one processor;

at least one memory; and one or more non-transitory, computer-readable storage media storing instructions, which, when executed by the at least one processor, cause the system to:

generate a training dataset for a machine learning classifier model by:

acquiring, using the set of condition monitoring sensors, a first fault code dataset relating to operation of an industrial machine, wherein the industrial machine includes one or more of earth-moving machinery, construction machinery, or power-generation machinery;

applying a transformation to the first fault code dataset to fuse fault code data with a first utilization dataset for the industrial machine, wherein the transformation includes two or more of (i) a fault-to-utilization ratio, (ii) a fault-to-output ratio, or (iii) a ratio change metric, wherein the training dataset comprises the transformed fault code data;

train the machine learning classifier model using the training dataset and a maintenance dataset labeled with maintenance event data;

acquire a second fault code dataset and a second utilization dataset;

execute the machine learning classifier model on the second fault code dataset and second utilization dataset to generate a maintenance event prediction set; and using the maintenance event prediction set, generate a maintenance plan.

2. The system of claim 1, wherein the instructions cause the system to selectively generate the second fault code dataset to include data for a predetermined set of components associated with an item in the second utilization dataset.

3. The system of claim 1, wherein the industrial machine is a first industrial machine, and wherein the second fault code dataset and the second utilization dataset pertain to a set of industrial machines that includes one or more industrial machines different from the industrial machine.

4. The system of claim 3, wherein the maintenance event prediction set comprises at least one inference regarding an automatically determined occurrence of a past maintenance event, the inference comprising a past maintenance event descriptor and a past maintenance event time.

5. The system of claim 3, wherein the maintenance event prediction set comprises at least one inference regarding an automatically predicted occurrence of a future maintenance event, the inference comprising a future maintenance event descriptor and a future maintenance event time.

6. The system of claim 3, the instructions further comprising automatically generating and causing a computing device to display a notification regarding the maintenance plan, wherein the computing device comprises at least one of an on-board computing system, an on-board navigation system, and a mobile computing device communicatively coupled to the one or more industrial machines.

7. The system of claim 6, wherein the notification comprises a user-interactive control to enable a user to subscribe to the maintenance plan or modify the maintenance plan.

8. One or more non-transitory, computer-readable media having instructions encoded thereon, which, when executed by at least one data processor of a computing system, cause the computing system to perform operations comprising:

generate a training dataset for a machine learning classifier model by:

acquiring, using a set of condition monitoring sensors, a first fault code dataset relating to operation of an industrial machine, wherein the industrial machine includes one or more of earth-moving machinery, construction machinery, or power-generation machinery;

applying a transformation to the first fault code dataset to fuse fault code data with a first utilization dataset for the industrial machine, wherein the transformation includes two or more of (i) a fault-to-utilization ratio, (ii) a fault-to-output ratio, or (iii) a ratio change metric, wherein the training dataset comprises the transformed fault code data;

train the machine learning classifier model using the training dataset and a maintenance dataset labeled with maintenance event data;

acquire a second fault code dataset and a second utilization dataset;

execute the machine learning classifier model on the second fault code dataset and second utilization dataset to generate a maintenance event prediction set; and using the maintenance event prediction set, generate a maintenance plan.

9. The media of claim 8, wherein the instructions cause the system to selectively generate the second fault code dataset to include data for a predetermined set of components associated with an item in the second utilization dataset.

10. The media of claim 8, wherein the industrial machine is a first industrial machine, and wherein the second fault code dataset and the second utilization dataset pertain to a set of industrial machines that includes one or more industrial machines different from the industrial machine.

11. The media of claim 10, wherein the maintenance event prediction set comprises at least one inference regarding an automatically determined occurrence of a past maintenance event, the inference comprising a past maintenance event descriptor and a past maintenance event time.

12. The media of claim 10, wherein the maintenance event prediction set comprises at least one inference regarding an automatically predicted occurrence of a future maintenance event, the inference comprising a future maintenance event descriptor and a future maintenance event time.

13. The media of claim 10, the instructions further comprising automatically generating and causing a computing device to display a notification regarding the maintenance plan, wherein the computing device comprises at least one of an on-board computing system, an on-board navigation system, and a mobile computing device communicatively coupled to the one or more industrial machines.

14. The media of claim 13, wherein the notification comprises a user-interactive control to enable a user to subscribe to the maintenance plan or modify the maintenance plan.

15. A computer-implemented method comprising:

generating a training dataset for a machine learning classifier model by:

acquiring, using a set of condition monitoring sensors, a first fault code dataset relating to operation of an industrial machine, wherein the industrial machine includes one or more of earth-moving machinery, construction machinery, or power-generation machinery;

applying a transformation to the first fault code dataset to fuse fault code data with a first utilization dataset for the industrial machine, wherein the transformation includes two or more of (i) a fault-to-utilization ratio, (ii) a fault-to-output ratio, or (iii) a ratio change metric, wherein the training dataset comprises the transformed fault code data;

training the machine learning classifier model using the training dataset and maintenance dataset labeled with maintenance event data;

acquiring a second fault code dataset and a second utilization dataset;

executing the machine learning classifier model on the second fault code dataset and second utilization dataset to generate a maintenance event prediction set; and using the maintenance event prediction set, generating a maintenance plan.

16. The method of claim 15, further comprising selectively generating the second fault code dataset to include data for a predetermined set of components associated with an item in the second utilization dataset.

17. The method of claim 15, wherein the industrial machine is a first industrial machine, and wherein the second fault code dataset and the second utilization dataset pertain to a set of industrial machines that includes one or more industrial machines different from the industrial machine.

18. The method of claim 17, wherein the maintenance event prediction set comprises at least one inference regarding an automatically determined occurrence of a past maintenance event, the inference comprising a past maintenance event descriptor and a past maintenance event time.

19. The method of claim 17, wherein the maintenance event prediction set comprises at least one inference regarding an automatically predicted occurrence of a future maintenance event, the inference comprising a future maintenance event descriptor and a future maintenance event time.

20. The method of claim 17, further comprising automatically generating and causing a computing device to display a notification regarding the maintenance plan, wherein the computing device comprises at least one of an on-board computing system, an on-board navigation system, and a mobile computing device communicatively coupled to the one or more industrial machines.

* * * * *